(12) United States Patent
Durand De Gevigney

(10) Patent No.: US 11,300,520 B2
(45) Date of Patent: Apr. 12, 2022

(54) METHOD AND SYSTEM FOR OPTICALLY INSPECTING A SUBSTRATE

(71) Applicant: UNITY SEMICONDUCTOR, Montbonnot-Saint-Martin (FR)

(72) Inventor: Mayeul Durand De Gevigney, Meylan (FR)

(73) Assignee: UNITY SEMICONDUCTOR, Montbonnot-Saint-Martin (FR)

( * ) Notice: Subject to any disclaimer, the term of this patent is extended or adjusted under 35 U.S.C. 154(b) by 0 days.

(21) Appl. No.: 16/959,930

(22) PCT Filed: Dec. 27, 2018

(86) PCT No.: PCT/EP2018/097014
§ 371 (c)(1),
(2) Date: Jul. 2, 2020

(87) PCT Pub. No.: WO2019/134887
PCT Pub. Date: Jul. 11, 2019

(65) Prior Publication Data
US 2021/0215617 A1 Jul. 15, 2021

(30) Foreign Application Priority Data
Jan. 5, 2018 (FR) ...................... 1850077

(51) Int. Cl.
*G01N 21/88* (2006.01)
*G01N 21/95* (2006.01)

(52) U.S. Cl.
CPC ..... *G01N 21/8806* (2013.01); *G01N 21/9501* (2013.01)

(58) Field of Classification Search
CPC ................ G01N 21/8806; G01N 21/9501

USPC ...................... 356/237.1–237.6, 239.1–239.8
See application file for complete search history.

(56) References Cited

FOREIGN PATENT DOCUMENTS

WO 2016/050735 A1 4/2016
WO 2016/050738 A1 4/2016

OTHER PUBLICATIONS

French Search Report from French Patent Application No. 1850077 dated Sep. 21, 2018.
(Continued)

*Primary Examiner* — Tri T Ton
(74) *Attorney, Agent, or Firm* — Greer, Burns & Crain, Ltd

(57) ABSTRACT

A method and related system for substrate inspection, includes: creating, based on two light beams originating from one light source, a measurement volume at the intersection between the two light beams, the measurement volume containing interference fringes and being positioned to extend into the substrate, the substrate moving relative to the measurement volume in a direction parallel to a main surface S of the substrate; acquiring a measurement signal representative of the light scattered by the substrate, as a function of the location of the measurement volume on the substrate; calculating at least one expected modulation frequency, of an expected signal representative of the passage of a defect of the substrate through the measurement volume; determining values representative of a frequency content of the measurement signal close to the modulation frequency, to constitute a validated signal representative of the presence of defects; and analyzing the signal to locate and/or identify defects.

15 Claims, 7 Drawing Sheets

(56) References Cited

OTHER PUBLICATIONS

International Search Report and Written Opinion for International Patent Application No. PCT/EP2018/097014, dated Apr. 18, 2019.

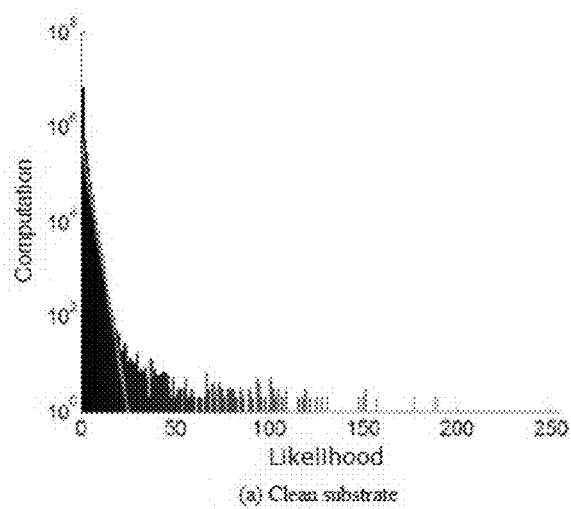
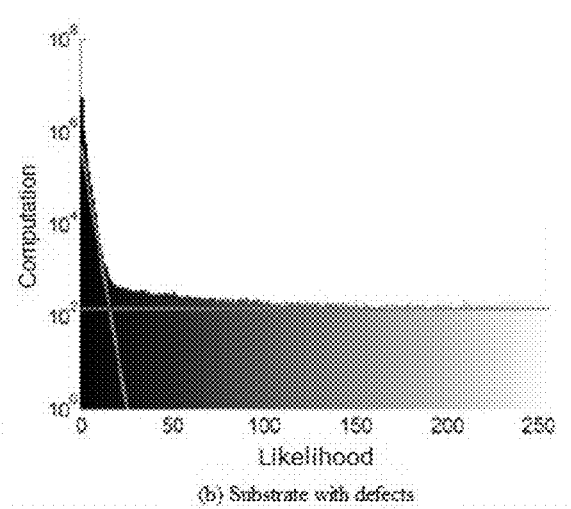
Fig. 7a          Fig. 7b
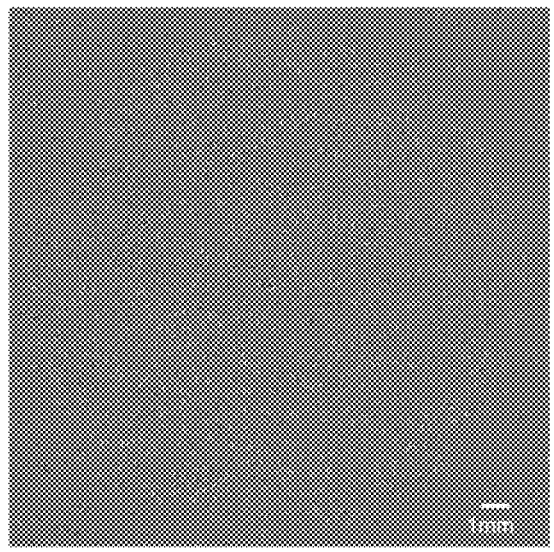
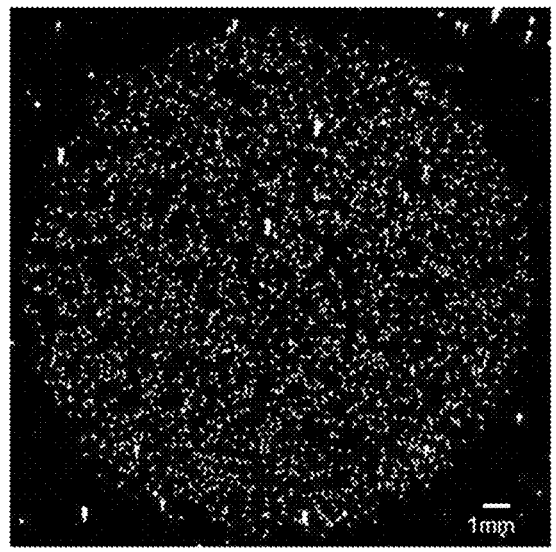
Fig. 8a          Fig. 8b

METHOD AND SYSTEM FOR OPTICALLY INSPECTING A SUBSTRATE

BACKGROUND

The present invention relates to a method for inspection of a substrate, such as a wafer, for example for microelectronics, optics or optoelectronics. It also relates to a system for inspection of a substrate implementing such a method.

The field of the invention is more particularly, but non-limitatively, that of optical detection by Doppler effect.

Substrates, such as wafers for electronics, optics or optoelectronics, must be inspected during and after the manufacture thereof so that any defects present on the surfaces or in the volume thereof can be detected and identified. These defects, generally of a very small size, can be crystal defects, abrasions, roughness, etc.

Generally, the inspection is intended not only to detect the presence or absence of a defect or a particle, but also to perform a classification of these defects and to provide items of qualitative information and/or statistical data on the defects, such as the location, size and/or nature thereof, for example. These items of information can be representative of the quality of the manufacturing process of the substrate or of a production step in which the substrate is used.

Inspection systems have been developed with a view to detecting increasingly small defects and supplying the aforementioned items of information.

Different techniques for the inspection of substrates are known.

Techniques based on a measurement of the intensity of dark-field scatter signals are known, as described for example in document U.S. Pat. No. 6,590,645 B1. Only the light scattered by a defect or a particle on the wafer is collected on a detector; the specular reflection is not acquired by the detector, which makes it possible to improve the detection contrast. A variation in the scattered intensity reveals the presence of a defect at the surface of the wafer.

Another technique is Laser Doppler Velocimetry or LDV.

This technique is described for example in document WO 2009/112704 and based on detection of the interferometric type. The operating principle is to create a volume of interference fringes at the intersection of two light beams originating from one and the same light source, and to make the wafer to be inspected pass through this measurement volume. The light beams and the detection elements are configured in such a way as to carry out a dark-field detection. When a defect or a particle passes through the interference fringes the presence thereof is shown on the detector by a measurement signal, for example an electrical signal, constituting a Doppler burst. A Doppler burst is a signal having a double frequency component: a low-frequency signal, forming the signal envelope and corresponding to the average light intensity scattered by the defect, and a high-frequency component corresponding to the Doppler frequency containing the information on the movement velocity of the defect and linked to the distance between the interference fringes.

The known techniques are based on intensity measurements. The quality of detection of a defect is then directly linked to the dynamics and the signal-to-noise ratio of the detection system. However, the nature and the sizes of the defects present on a substrate are very variable. Different difficulties can then occur.

Thus, certain types of defects can cause saturation of the detection signal and therefore be non-quantifiable. In addition, parasitic signals that do not correspond to the real presence of a defect but to artefacts may be captured. Conversely, small defects or parts of defect structures may not be detected.

In order to dispense with the numerous sources of parasitic measurements so as to optimize the signal-to-noise ratio and unambiguously extract signals making it possible to obtain items of information on the nature and characteristics of the defects, implementing measurement systems based on dark-field techniques requires significant means, such as multiple light sources and detectors or significant data processing.

SUMMARY

A purpose of the present invention is to propose a method and a system for inspection of a substrate that make it possible to overcome these drawbacks.

A purpose of the present invention is to propose a method and a system for inspection of a substrate allowing more reliable detection of defects.

A further purpose of the present invention is to propose a method and a system for inspection of a substrate making it possible to detect, distinguish and classify defects present on the substrate without installing complex and costly means of measurement and signal processing.

A further purpose of the present invention is to propose a method and a system for inspection of a substrate making it possible to map defects with current inspection devices with very little or no modification of the hardware architecture thereof.

These objectives are at least partially achieved with a method for inspection of a substrate, the method comprising the following steps:

creating, based on at least two light beams originating from one and the same light source, a measurement volume at the intersection between said at least two light beams, the measurement volume containing interference fringes and being positioned so as to extend over or into the substrate, said substrate being in movement with respect to said measurement volume in a direction parallel to a main surface of said substrate;

acquiring a measurement signal representative of the light scattered by the substrate, as a function of the location of the measurement volume on said substrate;

calculating at least one expected parameter, including at least one expected modulation frequency, of an expected signal representative of the passage of a defect of said substrate through the measurement volume.

determining characteristic values representative of a frequency content of the measurement signal in a neighbourhood around the expected modulation frequency, so as to constitute a validated signal representative of the presence of defects; and analyzing said validated signal in order to locate and/or identify defects.

According to the invention, the measurement volume is created at the intersection of two (or more) optical beams originating from one and the same source, which intersect with a non-zero angle. These beams thus generate interference fringes in this measurement volume.

The measurement signal representative of the light scattered by the substrate can be, for example, a signal acquired by a photodetector (such as an avalanche photodiode). This signal corresponds to the light scattered by the substrate during its passage through the measurement volume in a volume or one or more of the solid angles. Preferably, this scattered light excludes specular reflection. Thus, in the presence of a purely reflective substrate that does not generate scatter, the measurement signal should be zero.

When a source of scatter, such as a defect in the substrate (for example a hole or a particle) passes through the measurement volume it generates a scattered light the intensity of which is modulated over time, due to the movement of the wafer, by the interferences of the light beams. This intensity is thus modulated at a modulation frequency that depends on the arrangement of the light beams and on the movement velocity of the substrate.

The measurement signal corresponding to the passage of a source of scatter or a defect with the modulation frequency can be called a Doppler burst. The presence of the modulation frequency in the measurement signal constitutes a frequency signal, which makes it possible to distinguish the defects that pass through the measurement volume from the defects that generate scattered light outside this measurement volume. In fact, in this latter case the defects do not pass through the interference fringes and therefore do not generate a modulation frequency.

Advantageously, the method according to the invention thus makes it possible to identify and to distinguish the defects at least by a frequency signal, which can only be transmitted by defects passing through the measurement volume.

To this end, the method according to the invention implements a step of predicting or calculating an expected signal representative of the passage of a defect through the measurement volume. This calculation can relate to the expected modulation frequency. It can also relate to other expected parameters such as a signal shape or an envelope, which are indicated in the spectral domain by a modulation spectrum around the expected modulation frequency.

The method according to the invention also comprises a step of determining characteristic values representative of a frequency content of the measurement signal in a neighbourhood around the expected modulation frequency. These characteristic values are obtained by making a comparison of the measurement signal with characteristics of expected signals representative of defects passing through the measurement volume, essentially linked to the expected modulation frequency. Thus, a validated signal is constituted, based on these characteristic values, that is much more representative than the crude measurement signal of the presence of defects in the measurement volume.

Thus, the detection of a defect is no longer correlated with the light intensity backscattered by this defect. Even defects of very small size or which create very little scatter can be detected, in particular as a result of an improvement in the signal-to-noise ratio.

In addition, the method according to the invention makes it possible to distinguish a defect or a particle that generates a Doppler burst from a continuous scattering background. In fact, the continuous background is due to superposition of a plurality of scatterers that generate an intensity noise without a notable frequency component, since it corresponds to an incoherent superposition, or random phases, of bursts.

The method also makes it possible to distinguish a signal originating from the measurement volume from a signal generated outside this volume, as the latter does not comprise a notable frequency component at the expected modulation frequency. This is in particular the case for signals coming from the surface opposite the inspected face in the case of transparent substrates.

Thus, the invention makes it possible, for analysis purposes, to generate a validated signal, the characteristics of which for the detection of defects (specificity, discrimination capability, signal-to-noise ratio) are greatly improved compared to the intensity measurement signal.

The steps of calculating the expected parameters and of determining characteristic values in order to constitute the validated signal can be carried out during, before and/or after acquisition of the measurement signal representative of the scattered light. These steps can therefore be carried out in real time, and/or with stored measurement signals. They can be carried out by digital and/or analogue data processing devices.

All the steps of the method according to the invention can be carried out for one or more measurement signals measured during a movement of the substrate carried out so as to scan with the measurement volume, all or part of a surface of the substrate. This surface can be in particular one of the two outer surfaces of the substrate or a section or an interface within the volume of the substrate.

Furthermore, the method according to the invention can also comprise the following steps:

determining a threshold value of the characteristic values; and comparing the validated signal to said threshold value.

Such a comparison of the validated signal to a threshold value makes it possible to select all or only certain types of defects, and/or to reject a residual background noise.

According to an embodiment, the step of determining a threshold value can be carried out based on a validated signal obtained with a test substrate having known characteristics.

In particular, this step of determining a threshold value can be carried out based on a statistical study on a clean substrate free of sources of scatter, and/or on a substrate on which scattering spheres with known characteristics have been placed. The threshold value can be determined so as to be able to detect the greatest number of possible defects during inspection of a substrate, while still avoiding false detections.

According to an advantageous embodiment, the step of determining the characteristic values can comprise the following steps:

modelling the expected signal according to a model function, in order to produce a modelled signal;

comparing the modelled signal to the measurement signal, including calculating a distance within the meaning of a Euclidean norm between the modelled signal and the measurement signal.

The modelling step can be carried out, for example by modelling a Doppler burst (the expected signal) with a sinusoidal function amplitude-modulated by a Gaussian function, optionally with a continuous component. The characteristic values can then be obtained by carrying out for example a calculation of likelihood, as explained hereinafter, or of correlation between the Doppler burst modelled in this way and the acquired measurement signal. They are then representative of a measurement of similarity between the acquired measurement signal and an expected Doppler burst, or a probability that the acquired measurement signal contains a Doppler burst.

This embodiment has the advantage of taking into account, in addition to the local noise of the measurement signal and the expected modulation frequency, also the shape of the expected Doppler burst envelope.

According to another embodiment, the step of determining characteristic values can comprise pass-band filtering of the measurement signal using a pass-band suitable for transmitting only the frequency content of the measurement signal in a neighbourhood around the expected modulation frequency.

In this case, the characteristic value can take account, for example, of the modulation amplitude of the filtered measurement signal, or the ratio between the modulation amplitude of the filtered measurement signal and a continuous value of the measurement signal before filtering.

According to another embodiment, the step of determining characteristic values can comprise the following steps:

calculating a local Fourier transform of the measurement signal in order to obtain a local power spectral density.

determining a characteristic value based on the power spectral density at, or within a neighbourhood comprising, the expected modulation frequency.

A local Fourier transform is a Fourier transform calculated on a portion or a neighbourhood of the measurement signal, for example within a sliding window.

Of course, the step of determining the characteristic values can also implement other signal processing methods, such as wavelet transforms or time-frequency transforms.

Advantageously, the method according to the invention can also comprise a step of constructing an image of the substrate by using the validated signal.

In fact, by exploiting a plurality of characteristic values determined for the substrate as a whole, it is possible to construct an image, or map, of the substrate representing all of the defects retained based on the validated signal.

According to a non-limitative embodiment, the image construction step can comprise a step of assigning intensity values to characteristic values corresponding to (or located at) positions on or in the substrate, said intensity values corresponding to pixels of the image.

Thus, the method according to the invention makes it possible to visualize the present or absence of a defect on the substrate, the intensity values assigned to the pixels being independent of, or distinct from, an amplitude signal of light backscattered by the defects. In other words, the method according to the invention makes it possible to obtain a greater reliability of detection of the presence of defects, even in the case of defects of very small size.

According to embodiments, the method according to the invention can comprise a step of determining a representative parameter deduced from the measurement signal and/or the validated signal.

This representative parameter can be deduced from the validated signal, and/or from the measurement signal for the Doppler bursts validated on the basis of the validated signal. This representative parameter can be, for example, a likelihood ratio originating from the validated signal, or the visibility, the modulation amplitude of the burst, the maximum amplitude of the burst or an average of amplitude originating from the measurement signal or from the validated signal if this information is present therein.

According to embodiments, the method according to the invention can comprise an image construction step comprising assigning intensity values to representative values corresponding to (or located at) positions on or in the substrate, said intensity values corresponding to pixels of the image.

Advantageously, the method according to the invention can also comprise a step of classifying the pixels of the image as logical objects in order to reconstruct the validated defects.

In fact, as the constructed image only indicates the presence or absence of defects per pixel, the step of classifying the pixels as (binary) logical objects makes it possible to reconstruct the defects and thus to represent them and to classify them according to the size, shape, location, etc. thereof. The binary logical objects thus obtained can be processed and analyzed according to the methods of statistical analysis or recognition of known shapes.

Logical object maps can thus be formed based on characteristic values. Several maps constructed based on different types of characteristic values representative of one and the same detected signal and obtained by applying different processing methods can be constructed and combined together in order to further improve the distinguishing and classification of the defects. Thus, for example, several maps of defects corresponding to different threshold values of validated signals can be obtained in order to validate the measurements and improve the classification of the defects.

In addition, logical object maps formed based on the characteristic values can be used in order to carry out statistical analyses and study the characteristics of defects following a certain method of manufacture of the substrates. The corresponding steps of the manufacturing method can then be adapted as a function of these analyses.

Maps of scattering intensities obtained conventionally can be combined with maps established following the method according to the invention for analysis of the defects of a substrate.

The method according to the invention also makes it possible to create and compare images corresponding to characteristic or visibility values validated by different threshold levels. The defects reconstructed as logical objects can then appear or disappear wholly or partially, as the images obtained can have different levels of contrast or dynamics. The chosen validation thresholds can then be confirmed or modified. Thus, the analysis and classification of the defects can be improved.

Moreover, the method according to the invention makes it possible to compare images, or maps, corresponding to characteristic values and/or to intensity images obtained directly by light scattering by the substrate. The intensity images depend on the lighting conditions of the substrate, such as the light intensity, the polarization of the light beams, the angle of incidence thereof, and the characteristics of the defects. The combination of maps of characteristic values validated by a presence detection threshold of expected modulation frequency with maps of directly measured intensity makes it possible, for example, to collect items of information such as the roughness of the substrate, and to inspect transparent substrates at lighting wavelengths by distinguishing defects present at the surface or in the volume of the substrate and/or on both faces of the substrate. Comparison of these maps also allows the possibility of distinguishing the nature of the defects, the structures or sizes thereof.

Advantageously, the method according to the invention can be used for the inspection of substrates that are opaque or transparent at the inspection wavelength. In the case of an opaque substrate, only the surface facing the measurement volume can be inspected.

In particular, the method according to the invention can be implemented for the inspection of a transparent or opaque wafer for electronics, optics or optoelectronics, and in particular for representation of all of the defects present on a surface of such a wafer.

According to another aspect of the invention, a system is proposed for inspection of a substrate, the system comprising a measurement module comprising:

an interferometric device coupled to a light source in order to create, based on at least two light beams originating from the light source, a measurement volume at the intersection between said at least two light beams, the measurement volume containing interference fringes and being positioned so as to extend over or into the substrate;

a device for moving said substrate relative to said measurement volume in a direction parallel to a main surface of said substrate;

an optoelectronic device for acquiring a measurement signal representative of the light scattered by the substrate, as a function of the location of the measurement volume on said substrate; the system also comprising a processing module arranged in order to:

carry out a calculation of at least one expected parameter, including at least one expected modulation frequency, of an expected signal representative of the passage of a defect of said substrate through the measurement volume;

carry out a determination of characteristic values representative of a frequency content of the measurement signal in a neighbourhood around the expected modulation frequency, so as to constitute a validated signal representative of the presence of defects; and carry out an analysis of said validated signal in order to locate and/or identify defects.

The processing module can be incorporated in the measurement module, or be external to the measurement module and connected to the measurement module in a wired or wireless manner.

According to embodiments, the system of the invention can comprise a device for rotating the substrate about an axis of rotation perpendicular to a main surface of said substrate, and a device for moving the interferometric device in translation, arranged in order to move the measurement volume in a radial direction relative to the axis of rotation.

It should be noted that in this case, if the substrate is rotated at a constant velocity, the expected modulation frequency depends on the radial position of the measurement volume relative to the axis of rotation.

BRIEF DESCRIPTION OF THE DRAWINGS

Other advantages and characteristics of the invention will become apparent on reading the detailed description of implementations and embodiments which are in no way limitative, and from the attached drawings in which:

FIGS. 7a and 7b show examples of histograms for the determination of noise threshold;

FIGS. 8a and 8b show non-limitative examples of inspection of a substrate with the method of the present invention;

DETAILED DESCRIPTION

It is well understood that the embodiments that will be described below are in no way limitative. It is possible in particular to consider variants of the invention comprising only a selection of characteristics described below, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, the elements common to several figures retain the same reference.

In the embodiments presented, a substrate to be inspected according to the method of the present invention can be any wafer intended to be used in the field of electronics, optics or optoelectronics. The wafer can have a circumference that is circular or of any other shape according to the desired application of the wafer.

Figure 1:
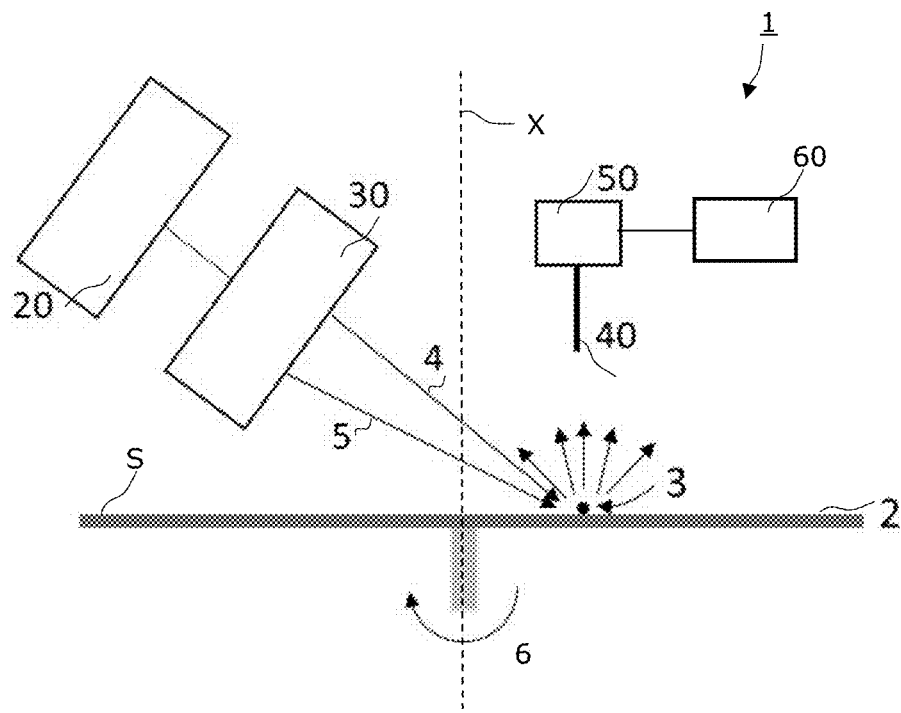
FIG. 1 is a diagrammatic representation of a non-limitative embodiment of a system according to the invention.

FIG. 1 shows diagrammatically an example of an inspection system according to the invention.

The system 1 comprises a light source 20 and an interferometric device 30 coupled to the light source arranged facing a surface S of the substrate 2 to be inspected.

The interferometric device 30 comprises a device intended to separate the light emitted by the light source 20 into two beams 4 and 5.

This interferometric device 30 can be produced with massive optical elements, i.e. for example a separator cube, reflecting mirrors and focusing optics.

It can also be produced with an optical fibre coupler that directs the light injected into an optical fibre to two other optical fibres and focusing optics forming the two beams 4 and 5.

It can also be produced with a planar optical light guide the entry of which is coupled to the light source 20 and comprising two branches in order to divide the beam originating from the light source 20 into two incident beams 4 and 5.

In all cases, the incident beams 4, 5 are oriented in relation to one another so as to intersect and form, at their intersection, a measurement volume comprising a plurality of parallel interference fringes, or at least oriented essentially in a direction determined by the directions of incidence of the beams 4, 5. The beams 4, 5 can be shaped by focusing optics. They can in particular be focused so that their intersection forming the measurement volume corresponds to the focalization point or "waist" of these beams, so as to minimize the size of the measurement volume. Different light polarization states can be used.

The light source 20 is a laser having a coherence length adapted in order to create the volume of interference fringes.

In the embodiments presented, the substrate 2 is driven in rotation about an axis of rotation or of symmetry X perpendicular to the surface S. In practice, the substrate 2 is placed and held on a suitable support, of the chuck type (not shown). The support is mobile and driven in rotation, for example by a motor. It comprises a
sensor, for example of the angular coder type, making it possible to know the angular position of the substrate as a function of time.

A detection module 50 of system 1 makes it possible to collect and receive the light scattered by the substrate 2 and to generate a measurement signal based on the collected light. The detection module 50 comprises in particular a photodetector, for example of the photodiode type, avalanche photodiode, CCD or MOS. The measurement signal reproduces the light intensity variation, corresponding to the interference fringes, of the light collected as a function of time.

The system 1 as shown in FIG. 1 also comprises an optical fibre 40 arranged between the surface S of the substrate 2 and the detection module 50, so as to collect and guide the scattered light towards the detection module 50. Elements, not shown in FIG. 1, can be placed between the substrate 2 and the optical fibre 40 so as to increase the amount of light collected by the fibre. These elements can be, in particular, concave lenses or mirrors. These may be in particular mirrors reproducing at least partially an elliptical shape with the measurement volume and the end of the optical fibre 40 (or a collimation optics placed facing this optical fibre 40) respectively positioned at the foci of this ellipse. Thus, the optical fibre 40 can collect the light scattered over substantial portions of solid angles.

When a defect 3 or a particle passes through the measurement volume with the interference fringes, the measurement signal obtained by the detection element 50 comprises a Doppler burst with a frequency component at a modulation frequency modulated by an envelope.

Figure 3:
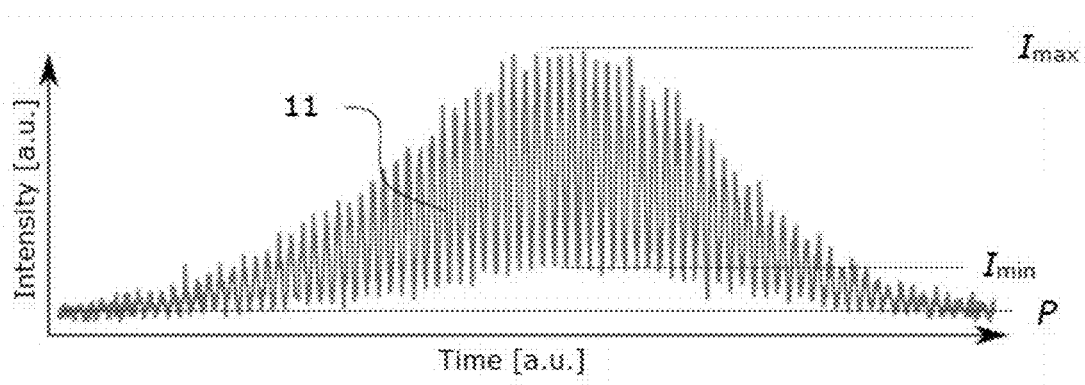
FIG. 3 shows an example of a Doppler burst present in an acquired measurement signal during inspection of a substrate.

An example of such a modulated burst is represented in FIG. 3. The signal 11 can be expressed for example in the form of an electrical voltage (in Volts) at the output of the detection module 50 as a function of time, or of an equivalent digitized signal.

Such a Doppler burst can be represented in the form of a signal 11 having a double frequency component: a low-frequency component, forming the signal envelope, corresponding to the average light intensity scattered by the defect, and a high-frequency
component, at a modulation frequency, containing the information on the velocity of the defect. The high frequency $f_D$, also called Doppler frequency, is linked to the velocity v of movement of the defect in the direction perpendicular to the fringes and to the distance $\Delta$ between the interference fringes by the following relationship: $f_D=v/\Delta$. FIG. 3 also illustrates the following parameters of a burst: the maxima of the envelopes $I_{max}$ and $I_{min}$ and the offset P of the signal.

The substrate 2 is installed on a rotating support, the angular velocity of which is known and measured. In addition to the rotational movement, a radial movement system (not shown) that moves the substrate 2 and its support, or the optical assembly with the interferometric device 30 and the optical fibre 40 of the detection module 50, makes it possible for the volume of interference fringes to cover the entire surface of the substrate, for example in a spiral movement. If the speed of rotation of the substrate 2 is kept constant, which is the easiest to carry out, the velocity with which a defect 3 passes through the measurement volume with the interference fringes depends on its radial position with respect to the axis of symmetry X. In this case, according to the relationship given above, the Doppler frequency $f_D$ is reduced when the defects are closer to the centre of the substrate 2. Of course, it is also possible to use a variable rotation speed. For example, a rotation speed that continuously decreases when the distance of the measurement volume from the axis of symmetry X increases, allows a constant Doppler frequency $f_D$ to be obtained.

The measurement volume, or interference fringes volume, extends in a region of the substrate encompassing the surface S. Preferably, the incident beams 4, 5 are arranged so that the dimension perpendicular to the surface S of the measurement volume is less than the thickness of the substrate 2. By way of example, for a substrate of approximately 1 mm thickness, the dimension of the measurement volume can be approximately 50 µm.

As previously explained, a defect present on the surface S in the measurement volume generates a measurement signal (the Doppler burst) with a frequency content different from a measurement signal generated by a defect present in the volume of the substrate or on the opposite surface, and which does not pass through the measurement volume. In fact, in this case the measurement signal does not comprise a modulation frequency.

The position of the measurement volume with the interference fringes with respect to the substrate 2 is known as a function of time. Thus, it is possible to calculate the expected modulation frequency, corresponding to the Doppler frequency $f_D$ corresponding to the presence of a defect.

Finally, still with reference to FIG. 1, the inspection system 1 according to the invention comprises a processing device 60, such as a microprocessor or a computer for example, connected to the interferometric device 30 and/or to the detection module 50 and configured to implement all the steps of a method for inspection of a substrate, such as for example steps 106-124 of the method 100 or steps 206-224 of the method 200 described hereinafter.

Figure 2:
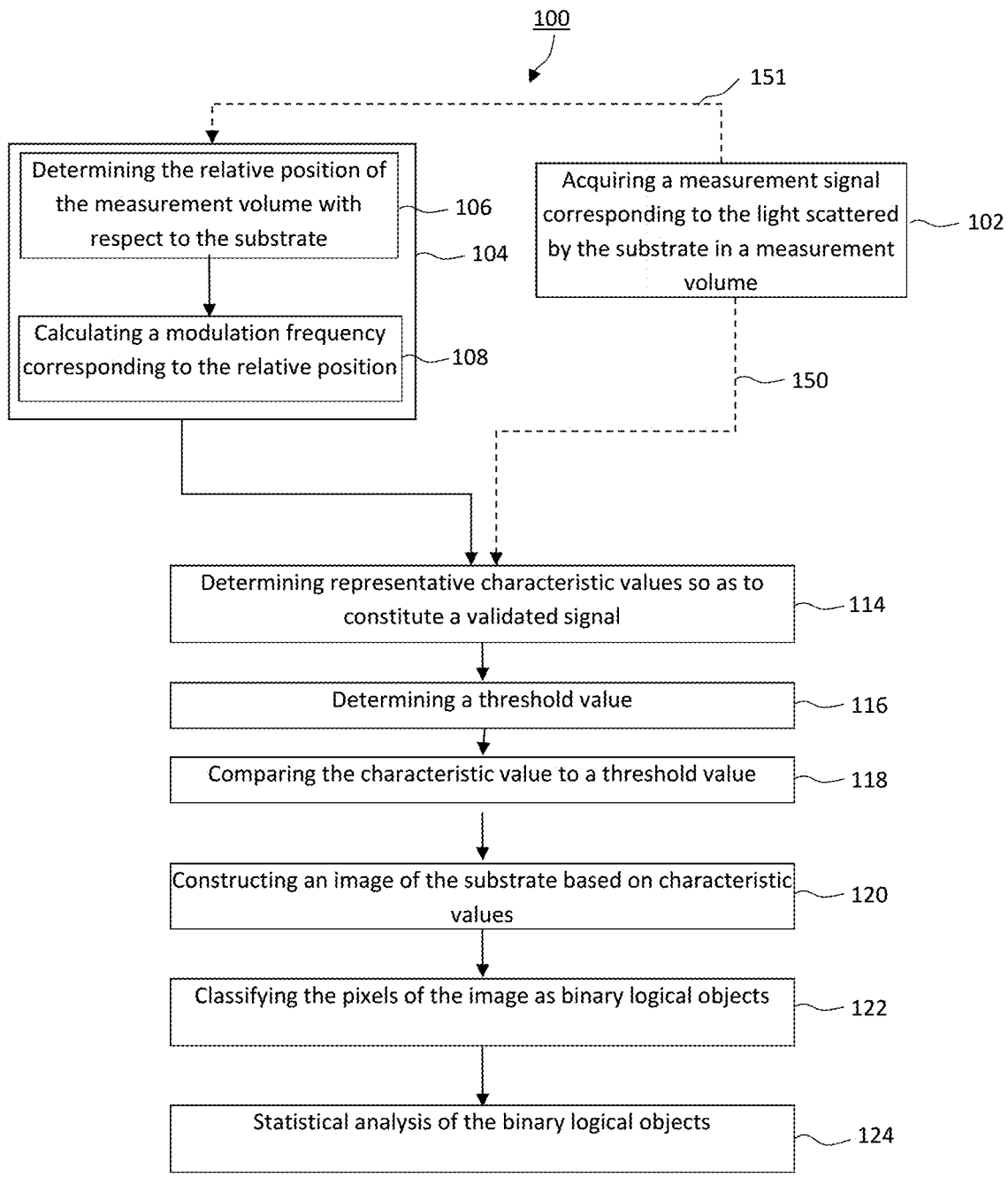
FIG. 2 is a diagrammatic representation of a non-limitative embodiment of a measurement method according to the invention.

FIG. 2 is a diagrammatic representation of a non-limitative embodiment of a method for inspection of a substrate according to the invention.

The method 100, shown in FIG. 2, comprises a step 102 of acquiring a measurement signal corresponding to the light scattered by the region of the substrate passing through a measurement volume. The measurement signal reflects the intensity scattered by the substrate as a function of time. As detailed below, the measurement volume is created based on two interfering light beams. The substrate rotates about its axis of symmetry (X) at a known angular velocity.

The method 100 also comprises a step 104 of determining an expected modulation frequency corresponding to a relative position of the measurement volume with respect to the substrate. This expected modulation frequency is the Doppler frequency, which is a function of the velocity with which a defect passes through the measurement volume and of the position on the substrate at which the defect is located. In order to carry out this step 104 of the method, it is therefore necessary to determine the relative position of the measurement volume with respect to the substrate in step 106 and to deduce therefrom the velocity of a defect passing through the measurement volume at this relative position. During step 108, the modulation frequency corresponding to the relative position can then be calculated.

According to an embodiment of the method 100, step 104 of determining the modulation frequency can be carried out in parallel or during step 102 of acquiring the measurement signal, as indicated by the arrow 150 in FIG. 2.

According to another embodiment, step 104 of determining the expected modulation frequency can be carried out after step 102 of acquiring the measurement signal has been partially or completely terminated, i.e. by using stored measurement signals.

The method 100 according to the embodiment shown also comprises a step 114 of calculating a validated signal representative of the presence of defects 3, which comprises a determination of characteristic values representative of a frequency content of the measurement signal in a neighbourhood around the expected modulation frequency.

Once the step 114 of calculating a validated signal has been carried out, the method 100 according to the embodiment shown in FIG. 1 continues with step 116, during which a threshold value of the characteristic values is determined, said threshold value also being called threshold. Of course, this step 116 of determining a threshold value may not necessarily be carried out at each iteration. Preferably, it is carried out in a prior phase, for example on test substrates, or during test measurements.

During a step 118, the validated signal is compared to the threshold value.

For example, the validated signal can be considered to be effectively representative of a real defect when it is greater than the threshold value. For example, it is then possible to set all the values that are less than the threshold value to zero, or to a determined value, in order to retain in the validated signal only the characteristic values that are in fact representative of a defect.

Examples of the determination of characteristic values and determination of the threshold value are given below.

According to a first approach, an expected signal, corresponding to an ideal Doppler burst is modelled, for example as a sinusoidal function at an expected modulation frequency amplitude-modulated by a Gaussian function. The modelled signal also contains a
continuous component, to which a noise is added. The parameters of this ideal signal can be estimated, as shown in FIG. 3. It is then possible to calculate a likelihood ratio between the ideal Doppler burst and a measured signal assumed to contain the expected modulation frequency. The more similar the measured signal to the ideal burst, the higher the likelihood ratio.

The likelihood ratio R can, for example, be defined as follows:

$$R = \frac{\exp\left(-\frac{\|f_{meas.} - f_{est.}\|^2}{\sigma_\omega^2}\right)}{\exp\left(-\frac{\|f_{meas.}\|^2}{\sigma_\omega^2}\right)}$$

In this equation, $f_{meas.}$ is the measured signal, $f_{est.}$ is the estimated ideal signal and $\sigma_\omega$ is the standard deviation representative of a residual noise between the estimated signal and the measured signal. $\|\ \|$ represents the Euclidian norm.

The ratio can be simplified and expressed in logarithmic form:

$$r = \ln(R) = \frac{\|f_{meas.}\|^2 - \|f_{meas.} - f_{est.}\|^2}{\sigma_\omega^2}$$

It is apparent that the ratio r increases when the noise reduces and/or when the estimated signal comes closer to the measured signal ($f_{est.} \cong f_{meas.}$).

The likelihood ratio can be used as characteristic value. A minimum likelihood ratio can be chosen in order to constitute the threshold value.

Figure 4A:
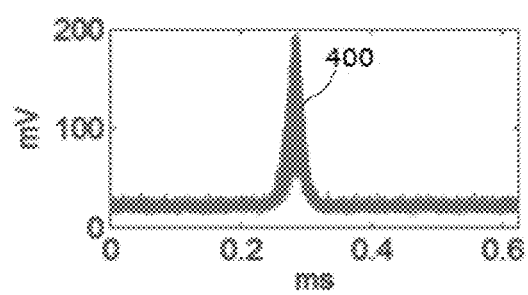
FIGS. 4a-4d represent an example of assignment of a characteristic value according to a step of the method according to the invention.
Figure 4C:
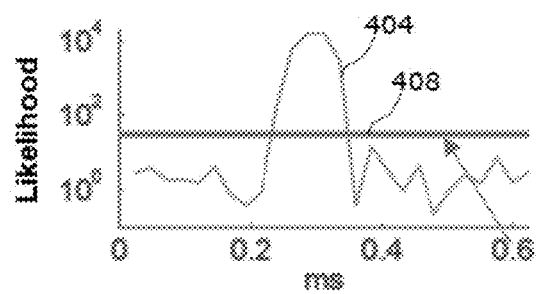
Figure 4B:
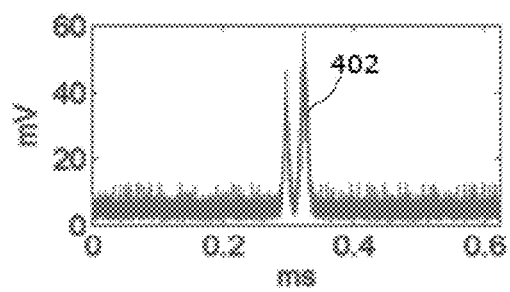

FIGS. 4a and 4b represent measurement signals 400, 402 acquired, for example, in step 102 of the method shown in FIG. 2, expressed as an electrical voltage (mV) as a function of time (ms). The signal 400 in FIG. 4a corresponds to a particle that passes through the measurement volume, and contains the expected modulation frequency. The signal 402 in FIG. 4b corresponds to a particle that generates scattering, but which does not pass through the measurement volume (for example a particle present on another face of the substrate 2). It therefore does not contain the expected modulation frequency.

This is verified by calculating the likelihood ratio as detailed above.

Figure 4D:
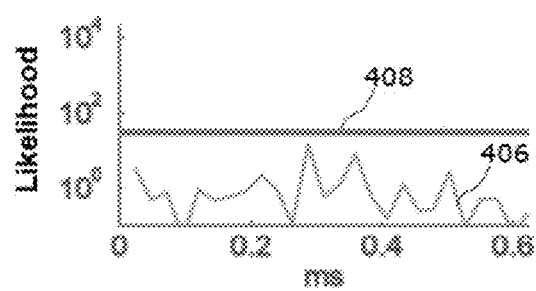

The results of the calculation are shown in FIGS. 4c and 4d respectively. When the measurement signal contains a Doppler burst, the likelihood ratio 404 increases and exceeds a threshold value 408 (FIG. 4c). In the opposite case, the likelihood ratio 406 constitutes noise only, and does not exceed the threshold value 408 (FIG. 4d). It can therefore be concluded that the measurement signal 402 of FIG. 4b is not due to an element passing through the measurement volume.

According to a second approach for the determination of characteristic values of a measurement signal, pass-band filtering of the measurement signal is carried out. The pass-band of the filter is adapted so as to transmit only the part of the measurement signal around the expected modulation frequency. The other frequencies that may be present in the signal are therefore attenuated or rejected. The threshold value can then be chosen so as to retain only the validated signals with a modulation amplitude at the expected modulation frequency greater than a minimum value and reject the other signals.

Figure 5A:
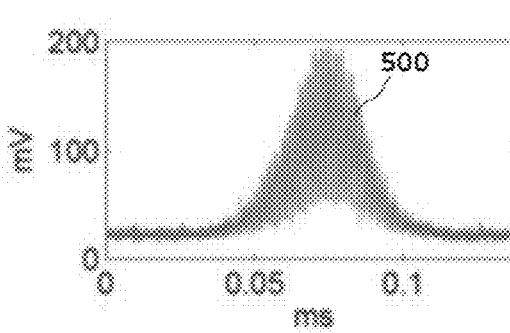
FIGS. 5a-5d represent another example of assignment of a characteristic value according to a step of the method according to the invention.
Figure 5C:
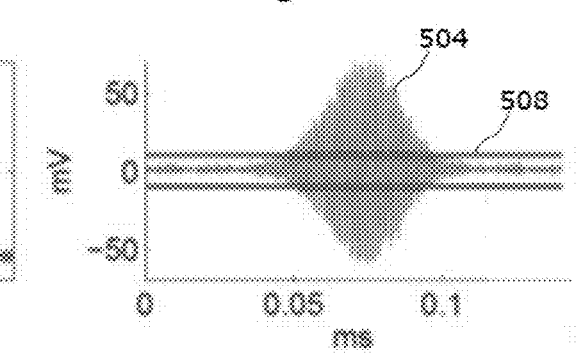
Figure 5B:
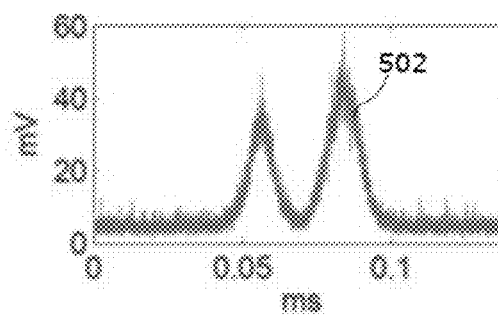
Figure 5D:
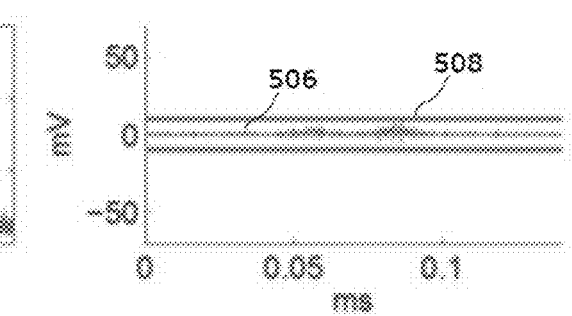
Figure 6A:
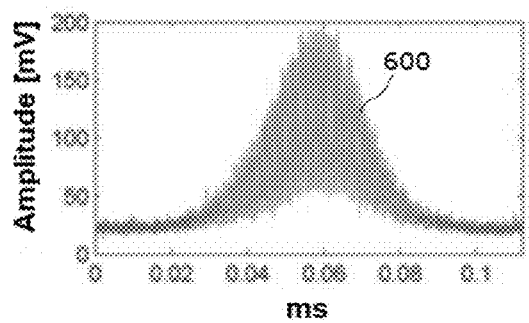
FIGS. 6a-6d represent another example of assignment of a characteristic value according to a step of the method according to the invention.
Figure 6C:
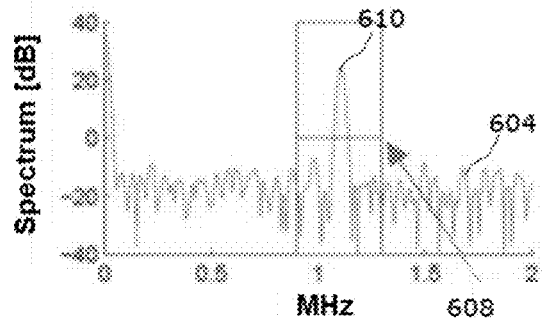
Figure 6B:
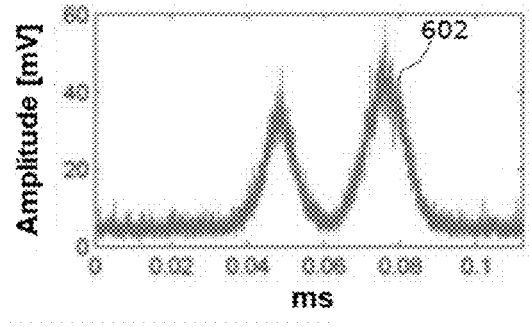
Figure 6D:
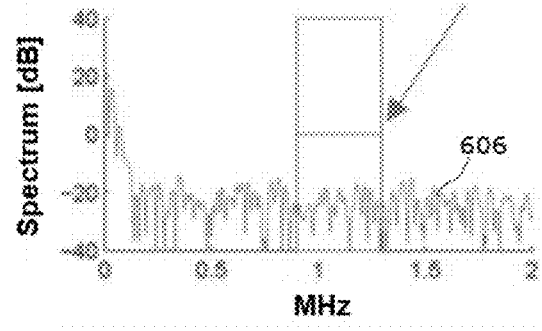

FIGS. 5a and 5b show measurement signals 500, 502 respectively, the first containing a Doppler burst, the second not containing the expected modulation frequency. The corresponding validated signals originating from the pass-band filtering 504, 506 are shown in FIGS. 5c and 5d, respectively. The representative characteristic value can be, for example, the amplitude value of the modulation of the filtered signal 504, 506 or a visibility value representing the ratio of the modulation amplitude of the filtered signal to the continuous value of the unfiltered measurement signal. The threshold value 508 can be determined as being a minimum value for the characteristic value accepted as being representative of a real defect, as shown in FIGS. 5c and 5d.

According to a third approach for the determination of characteristic values of a measurement signal, spectral detection can be carried out by performing a local Fourier transform of the measurement signal, for example in a sliding time window. In the spectrum
obtained, the peak corresponding to the expected modulation frequency can be chosen as the characteristic value representative of the real presence of a Doppler burst. As previously described, it is possible to determine a threshold such that the amplitude value of this peak must be greater than a threshold value in order to be representative of the presence of a real defect. In order to take account of the amplitude modulation of the envelope, it is also possible to choose as characteristic value a measurement of energy or power in a spectral band encompassing the expected modulation frequency.

An example of this approach is shown in FIGS. 6a-6d. Measured signals 600, 602 (FIGS. 6a and 6b) as well as their respective spectra 604, 606 (FIGS. 6c and 6d, in dB) are shown. In the example represented, the spectrum 604 of the signal 600 containing a Doppler burst has a peak 610 corresponding to the expected modulation frequency. The threshold value 608 is chosen so as to retain only the parts of the validated signal that contain a spectral component of amplitude greater than the threshold at the expected modulation frequency. In the spectrum 606 of the signal 602 not containing the Doppler burst, no peak can be seen apart from that of the continuous component (0 MHz).

Other approaches for the assignment of the characteristic value can also be used.

The choice of the threshold value is considered in greater detail hereinafter.

Generally, the threshold value depends both on the a priori probability that a defect or a particle is present on or in the substrate, and on the cost of a false detection and of non-detection; it being possible to reach a compromise for this figure. The threshold value also depends on the frequency of the Doppler bursts, the signal-to-noise ratio of the Doppler bursts detected and the type of noise in question. The aim is to detect weak signals without noise in the measurement signals resulting in too many false detections. Moreover, the threshold value can be fixed or can be adapted as a function of the preferred choice criterion. In order to determine a threshold value taking account of the constraints of the inspection system, a statistical study can be carried out on substrates or calibration zones. This
study consists of observing a histogram of the characteristic values obtained during an inspection of clean wafers (i.e. free from sources of scatter) or with deposits of spheres having well-defined characteristics. The threshold value can be determined so as to be able to detect the greatest number of defects, while best avoiding false alerts.

FIGS. 7a and 7b show histograms of characteristic values obtained by calculating likelihood ratios for two substrates.

For FIG. 7, the substrate is assumed to be clean, or at least comprises very few particles, as the substrates are never perfectly clean. The histogram shows the distribution of the characteristic values calculated, which corresponds essentially to the noise level of the inspection system.

For FIG. 7b, the substrate is polluted with particles. The histogram shows a very significant decrease in the occurrence of the characteristic values in the low levels corresponding to the noise, and a flat zone covering the entire histogram and corresponding to the detections of defects. In addition to the false detections, the real detections corresponding to Doppler bursts caused by real defects are thus visualized.

Knowing the decreasing trend for the noise, it is possible by using the histogram in FIG. 7a corresponding to the clean substrate, to determine an optimal threshold value in order to both detect the highest possible number of Doppler bursts and to avoid a maximum of false detections. In the example shown, the threshold value can be established with a likelihood ratio between 20 and 50, for example. This threshold can be established for example by finding the intersection with the x-axis of the histogram of a straight line representative of the decrease in the occurrences for the low characteristic values corresponding to the noise.

It can be observed that the threshold established with the clean substrate can be applied to the measurements carried out on the polluted substrate, as shown in FIG. 7b.

The threshold value can also vary as a function of the parameters of the measurement volume, the speed of rotation of the substrate and the density of the defects on the inspected substrates. When the system or the method for the acquisition of the signals is changed significantly, it may be necessary to verify and readjust the threshold value.

Of course, the detection threshold can be established in any other way, for example by analyzing false detections, and/or instances of absence of detection on known samples.

Doppler bursts for which the respective characteristic values are greater than the chosen threshold value are considered as validated bursts during step 116 of the method 100, i.e. indicating real instances of the presence of defects on the substrate.

Still with reference to FIG. 2, during a step 120 of the method 100 according to the invention, the characteristic values associated with the bursts that are validated and thus representative of real defects are associated with the positions on the substrate at which they were detected, in order to form an image. To this end, each pixel of the image is associated with an intensity value corresponding to the characteristic value. For example, the value 1 can be associated with a characteristic value of a validated burst, and the value 0 can be associated with a burst that has not been validated, i.e. the characteristic value of which does not exceed the chosen threshold level.

FIGS. 8a and 8b show step 120 of the method 100.

FIG. 8a shows the measurement signal, represented in greyscale. FIG. 8b shows the validated signal after application of the threshold on this same substrate. The characteristic value used in FIG. 8b is the likelihood ratio. The discrimination capability (detection of "true" defects) of the validated signal can be clearly observed.

The method 100 according the embodiment shown in FIG. 2 also comprises a step 122 of classifying the pixels of the image constructed with the characteristic values as binary logical objects (called "binary large objects" or "blobs"). This step 122 makes it possible to group the pixels into defects. Known methods for the processing and statistical analysis of images can be used in order to carry out this step.

During a step 124, for each blob or defect, the parameters and physical characteristics thereof are analyzed statistically. These parameters and characteristics can include, for example, the area, shape, ellipticity, orientation, likelihood (if this characteristic value was used), etc. Shape recognitions can also be carried out.

Figure 9:
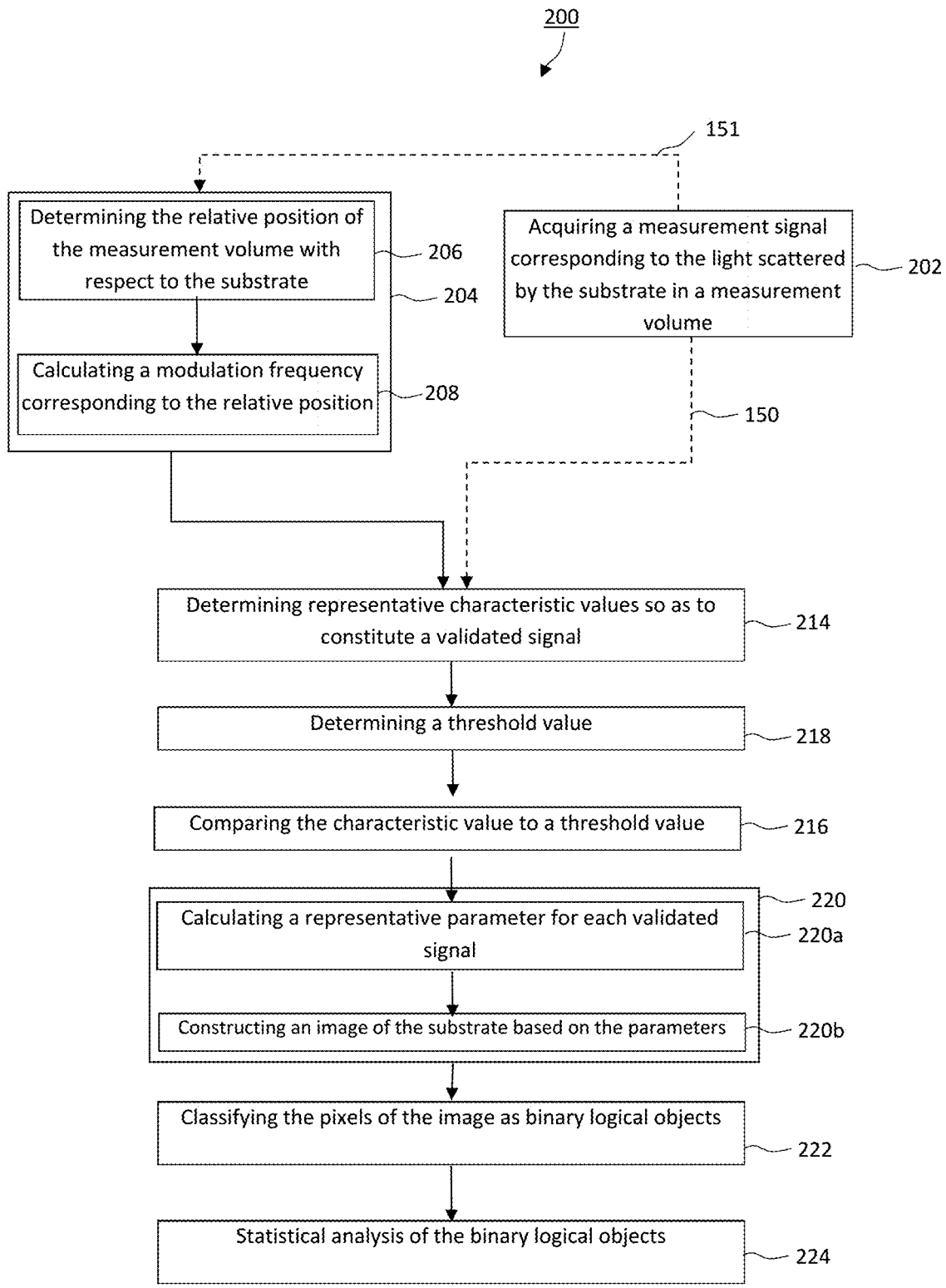
FIG. 9 is a diagrammatic representation of another non-limitative embodiment of the measurement method according to the invention.

FIG. 9 is a diagrammatic representation of another non-limitative embodiment of the method for inspection of a substrate according to the invention.

Steps 202 to 218, 222 and 224 of the method 200, shown in FIG. 9, are identical to steps 102 to 118, 122 and 124 of the method 100, shown in FIG. 2, and will therefore not be described hereinafter.

Once the Doppler bursts have been validated by comparing the validated signal or respective characteristic values to the threshold values in step 218, during a step 220a, a parameter representative of the validated bursts is determined. This representative parameter can be deduced from the validated signal, and/or from the measurement signal for the Doppler bursts validated on the basis of the validated signal. This representative parameter can be, for example, a likelihood ratio originating from the validated signal, or the visibility, the modulation amplitude of the burst, the maximum amplitude of the burst or an average amplitude originating from the measurement signal or from the validated signal if this information is present therein.

Figure 10:
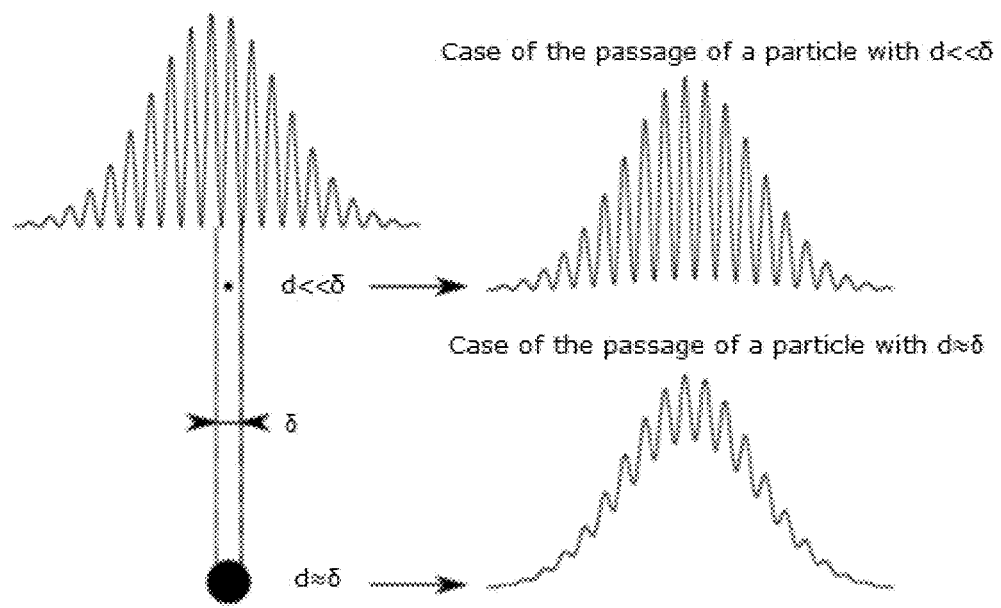
FIG. 10 shows a non-limitative example of inspection of a substrate with the method of the present invention.

By way of example, it is possible to obtain the size of the defect passing through the measurement volume, based on the modulation amplitude at the characteristic modulation frequency of the passage of a defect. This relationship is shown in FIG. 10, with a circular defect 3 having a diameter d. The larger the size d of the defect 3 with respect to the inter-fringe distance δ in the measurement volume, the smaller the ratio between the modulation amplitude and the maximum of the measurement signal envelope, corresponding to the contrast.

The modulation amplitude can be calculated in different ways. One method is described in W. M. Farmer, «Measurement of Particle Size, Number Density, and Velocity using a Laser Interferometer», Appl. Opt., 11, pp. 2603-2612, 1972. The modulation amplitude is expressed in terms of a visibility parameter V defined as follows:

$$V = \frac{I_{max} - I_{min}}{I_{max} + I_{min} - 2P}$$

The intensities $I_{max}$ and $I_{min}$ as well as the offset P are defined in FIG. 3. The visibility V is then used in order to directly deduce the diameter of a particle therefrom.

After step 220a, during a step 220b, an image is constructed by associating the representative parameter, such as the visibility, of each validated burst with a position on the substrate, in a similar way to step 120 of the method 100 described with reference to FIG. 2.

According to another embodiment, the image construction step of the method according to the invention uses the envelope parameters representative of the detected bursts, originating from the validated signal. These representative parameters can be the maxima of the envelopes $I_{max}$, $I_{min}$ and the offset P, as shown in FIG. 3. These parameters can be estimated during the step of assigning the characteristic values, as previously described for calculation of the likelihood ratio. Thus, the amplitude A of the measurement signal can be deduced directly by calculating:

$A=(I_{max}+I_{min})/2$.

Image intensity values can then be assigned to each parameter A in order to construct a map of validated defects.

Of course, the invention is not limited to the examples which have just been described and numerous adjustments can be made to these examples without exceeding the scope of the invention.

The invention claimed is:

1. A method for inspection of a substrate, the method comprising the following steps:
   creating, based on at least two light beams originating from one and the same light source, a measurement volume at the intersection between said at least two light beams, the measurement volume containing interference fringes and being positioned so as to extend over or into the substrate, said substrate being in movement with respect to said measurement volume in a direction parallel to a main surface of said substrate;
   acquiring a measurement signal representative of the light scattered by the substrate, as a function of the location of the measurement volume on said substrate;
   calculating at least one expected parameter, including at least one expected modulation frequency, of an expected signal representative of the passage of a defect of said substrate through the measurement volume;
   determining characteristic values representative of a frequency content of the measurement signal at the expected modulation frequency, so as to constitute a validated signal representative of the presence of defects; and
   analyzing said validated signal in order to locate or identify, or both locate and identify, defects.

2. The method according to claim 1, characterized in that it also comprises the steps of:
   determining a threshold value of the characteristic values; and
   comparing the validated signal to said threshold value.

3. The method according to claim 2, characterized in that the step of determining a threshold value is carried out based on a validated signal obtained with a test substrate having known characteristics.

4. The method according to claim 1, characterized in that the step of determining characteristic values comprises the following steps:
   modelling the expected signal according to a model function, in order to produce a modelled signal;
   comparing the modelled signal to the measurement signal, including calculating a distance within the meaning of a Euclidian norm between the modelled signal and the measurement signal.

5. The method according to claim 1, characterized in that the step of determining characteristic values comprises pass-band filtering of the measurement signal using a pass-band suitable for transmitting only the frequency content of the measurement signal at the expected modulation frequency.

6. The method according to claim 5, characterized in that the characteristic value takes account of:
   the modulation amplitude of the filtered measurement signal; and
   the ratio between the modulation amplitude of the filtered measurement signal and a continuous value of the measurement signal.

7. The method according to claim 1, characterized in that the step of determining characteristic values comprises the following steps:
   calculating a local Fourier transform of the measurement signal in order to obtain a local power spectral density; and
   determining a characteristic value based on the power spectral density at the expected modulation frequency.

8. The method according to claim 1, characterized in that it also comprises a step of constructing an image of the substrate by using the validated signal.

9. The method according to claim 8, characterized in that the image construction step comprises a step of assigning intensity values to characteristic values corresponding to positions on or in the substrate, said intensity values corresponding to pixels of the image.

10. The method according to claim 1, characterized in that it comprises a step of determining a representative parameter deduced from the measurement signal or the validated signal, or from both the measurement signal and the validated signal.

11. The method according to claim 10, characterized in that it comprises an image construction step comprising assigning intensity values to representative parameters corresponding to positions on or in the substrate, said intensity values corresponding to pixels of the image.

12. The method according to claim 9, characterized in that it also comprises a step of classifying the pixels of the image as binary objects in order to reconstruct the validated defects.

13. The method according to claim 1, characterized in that it is implemented for the inspection of a transparent or opaque wafer for electronics, optics or optoelectronics.

14. A system for inspecting a substrate, the system comprising:
- an interferometric device coupled to a light source in order to create, based on at least two light beams originating from the light source, a measurement volume at the intersection between said at least two light beams, the measurement volume containing interference fringes and being positioned so as to extend over or into the substrate;
- a device for moving said substrate relative to said measurement volume in a direction parallel to a main surface of said substrate;
- an optoelectronic device for acquiring a measurement signal representative of the light scattered by the substrate, as a function of the location of the measurement volume on said substrate;
- the system also comprising a processing module arranged for:
- carrying out a calculation of at least one expected parameter, including at least one expected modulation frequency, of an expected signal representative of the passage of a defect of said substrate through the measurement volume;
- carrying out a determination of characteristic values representative of a frequency content of the measurement signal at the expected modulation frequency, so as to constitute a validated signal representative of the presence of defects; and
- carrying out an analysis of said validated signal in order to locate or identify, or both located and identify, defects.

15. The system according to claim 14, characterized in that it comprises a device for rotating the substrate about an axis of rotation perpendicular to a main surface of said substrate, and a device for moving the interferometric device in translation, arranged in order to move the measurement volume in a radial direction relative to the axis of rotation.

* * * * *